United States Patent [19]
Hess et al.

[11] 3,855,069
[45] Dec. 17, 1974

[54] FORMATION REDUCTION IN PRESSURE COKING EQUIPMENT

[75] Inventors: Howard V. Hess, Glenham; William F. Franz, Gardiner; Edward L. Cole, Fishkill, all of N.Y.

[73] Assignee: Texaco Inc., New York, N.Y.

[22] Filed: Jan. 15, 1973

[21] Appl. No.: 323,554

[52] U.S. Cl............ 201/2.5, 201/10, 201/25, 162/30, 210/50, 210/56, 210/71
[51] Int. Cl............................................ C10b 43/14
[58] Field of Search.......... 48/211, 197 A; 110/8 C; 162/30; 203/7, 100; 208/48 R, 50; 210/50, 56, 71; 201/2.5, 10, 25

[56] References Cited
UNITED STATES PATENTS

| | | |
|---|---|---|
| 3,558,426 | 1/1971 | Hess et al. ........................ 162/30 |
| 3,181,600 | 5/1965 | Woodward et al. ............... 203/100 |
| 3,392,089 | 7/1968 | Guptill et al. ..................... 203/100 |

Primary Examiner—Samih N. Zaharna
Assistant Examiner—Peter A. Hruskoci
Attorney, Agent, or Firm—T. H. Whaley; C. G. Ries

[57] ABSTRACT

Formation of mineral type scale in pressure coking equipment used in coking waste materials in the liquid phase is eliminated by effecting the coking of such materials using direct counter-current heat exchange with a hot hydrocarbon stream which is kept continuously circulating along the walls of the equipment.

7 Claims, 1 Drawing Figure

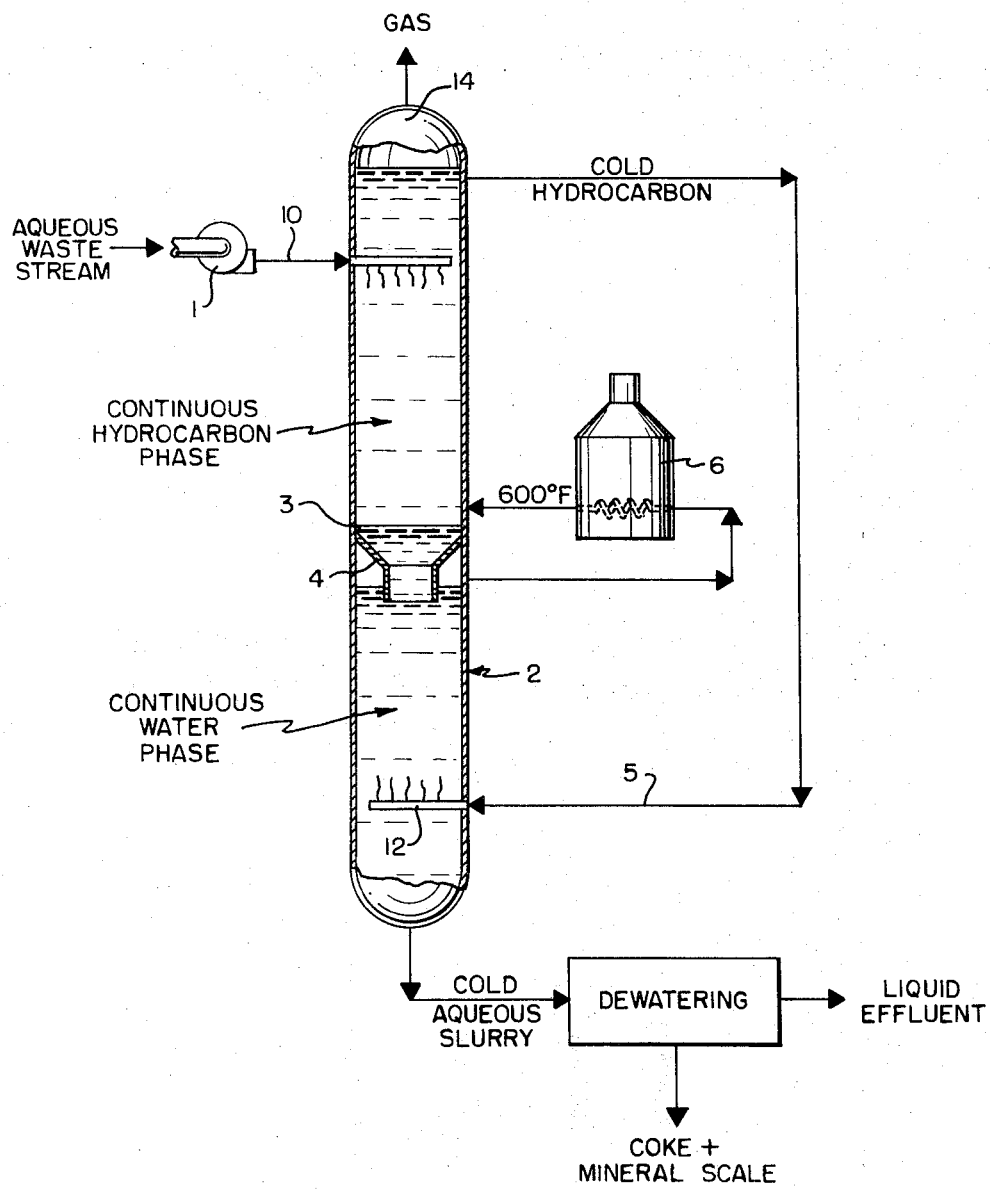

3,855,069

FORMATION REDUCTION IN PRESSURE COKING EQUIPMENT

BACKGROUND OF THE INVENTION

This invention is concerned with an improvement in the coking of waste materials in the liquid phase whereby scale formation on the pressure coking equipment used is eliminated.

In commonly assigned U.S. Pat. No. 3,507,788 issued Apr. 21, 1970 there is disclosed a process for treating aqueous wastes by coking same in the absence of added free oxygen at a temperature of 400° to 750°F. under a pressure of about 300 to 3000 psig for a time ranging from about 0.5 minutes to 6 hours.

The above outlined process and subsequent variations thereof covered by a number of commonly assigned patents are carried out in pressure coking equipment. With experience it has been found that a large portion of the real cost of such equipment is due to maintenance problems arising during use, and, in particular, to the formation of scale in the heat exchangers associated with the equipment.

The main object of this invention therefor is to provide a modified process wherein such scale formation is eliminated.

This object is achieved in accordance with the present invention by using direct countercurrent heat exchange between the feed to be coked and a hot hydrocarbon stream.

DESCRIPTION OF DRAWINGS

This and other related objects of the present invention will become apparent as the description thereof proceeds particularly when taken together with the accompanying drawing the single FIGURE of which is a flow diagram showing a simple arrangement for performing the process of the invention.

DESCRIPTION OF PREFERRED EMBODIMENTS

Referring to the drawing, the relatively cool, aqueous waste stream is pumped to system pressure by pump 1 and introduced through pipe 10 into the upper part of a vertically elongated contacting zone such as tower 2. Preferably such introduction is effected by means of spargers. The top part of the contacting zone contains an upflowing continuous hydrocarbon phase.

The waste stream in droplets descends through the hydrocarbon phase; is heated and the cokable materials are coked. The mineral scale materials are precipitated but do not stick to the walls of the vessel which remain wet with hydrocarbon. The aqueous phase and coke and mineral scale particles are allowed to coalesce at the interface 3 and then pass as a continuous aqueous slurry through the trap-tray 4. The bottom of the tower is filled now with a continuous aqueous phase containing suspended coke and mineral scale particles. Cold hydrocarbon from the top of tower 2 is passed through line 5 through a sparger 12 and droplets of hydrocarbon are heated as they pass through the hot aqueous phase; are finally collected at the trap tray and routed through the heater 6 where any makeup heat for the process is supplied. The cold aqueous slurry from the bottom of the tower is de-watered to produce an aqueous effluent, coke and mineral scale. The aqueous effluent, now with greatly reduced COD and BOD can be treated further by biological oxidation or carbon absorption etc. and discharged to receiving waters. The solids from the dewatering step may be used as landfill or burned to recover its heat content.

Gas, largely $CO_2$, is produced in the process. Should this gas contain objectionable materials such as $H_2S$, it can be burned in the fired heater 6 to produce the relatively less noxious $SO_2$ which is vented with flue gas from fired heater 6.

This process is applicable to waste streams where the waste materials are largely from carbohydrate origin and thus are amenable of coking at temperatures in the range of 450°–650°F. Examples of wastes treated by liquid phase coking are shown in Table I below. These wastes were coked at 550°F. and 1000 psig in the liquid phase.

| Liquid Waste Charges | Charge COD | Liquid Effluent COD* | COD Removal % | Dry Coke Yield Wt. % of charge | Ash Wt. % dry coke |
|---|---|---|---|---|---|
| Raw sewage sludge | 60 | 9.2 | 84.7 | 2.0 | 36.0 |
| Biological sludge | 67 | 13.9 | 79.0 | 2.5 | 51.6 |
| Spent sulfite wood pulping liquid | 215 | 16.0 | 93.0 | 9.4 | 8.0 |
| Spent kraft wood pulping liquor | 167 | 24.0 | 86.0 | 5.2 | 8.5 |
| Simulated potato waste | 34 | 10.3 | 69.0 | 0.9 | 1.0 |
| Simulated orange waste | 122 | 27.0 | 78.0 | 4.1 | 2.5 |
| whey liquid | 57 | 12.4 | 78.0 | 2.0 | 0.6 |

*COD in grams $O_2$/liter.

In each of the runs represented in the above table the measure of scale mixed with coke was noted.

Normally liquid hydrocarbons are generally suitable for use in the process of this invention. Hydrocarbons and mixtures of hydrocarbons containing from 6 to 30 carbon atoms per molecule may be used, with hydrocarbons of 6 to 12 carbon atoms being preferred. Various petroleum fractions including kerosine, naphtha, odorless spirits gasoline, lubricating oil, "alkylation bottoms", i.e. the bottoms fractions obtained from the alkylation of isobutane with butylenes and or propylene, $C_9$–$C_{10}$ aromatic hydrocarbons, e.g., aromatic hydrocarbons obtained by alkylation of benzene or toluene with propylene, Udex extract, i.e. an aromatic hyrocarbon fraction obtained from petroleum naphtha by extractions with aqueous diethylene glycol, may be used in the process. Examples of individual hydrocarbon types which can be used in the process, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-penetene, -methyl-etc.; alicyclic hydrocarbons, e.g. methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g. benzene, toluene, cumene, xylenes, methylnaphthalenes, etc.

The preferred organic liquids are those which remain stable under waste coking conditions of 400° to 750°F. and pressures of 300 to 3000 psig.

What is claimed:

1. In a process for preventing the formation of scale on the walls of a pressure coking tower used for coking cokable aqueous waste materials in the liquid phase, the steps of:

passing relatively cool aqueous waste into direct counter-current contact with a relatively hot liquid hydrocarbon in the upper part of said coking tower whereby said hydrocarbon portion is cooled and said aqueous waste is heated at a temperature of 400° to 750°F under a pressure of 300 to 3500 psig to coke cokable materials in said waste and to precipitate scale to form a dispersed aqueous slurry, flowing the aqueous slurry downwardly into the lower part of said tower, withdrawing at least a part of said cooled hydrocarbon from the upper part of said tower and passing the same in direct counter-current contact with said downwardly flowing aqueous slurry in said lower part of said tower thereby cooling said slurry, withdrawing said slurry including said scale from the lower part of said tower, and withdrawing cooled hydrocarbon liquid which has contacted said slurry from the lower part of said tower, the passage of the liquid hydrocarbon in said upper and lower parts of said tower being effective to wet the walls of said tower and prevent scale from adhering thereto.

2. The process according to claim 1 wherein said hydrocarbon is maintained as a continuous phase.

3. The process according to claim 1, wherein products are withdrawn as a slurry and dewatered to separate coke and mineral scale from a liquid effluent having reduced COD and BOD as compared with those of the aqueous waste.

4. The process according to claim 1 wherein said aqueous waste is sparged into the upper part of said tower and said hydrocarbon is sparged into lower part of said tower.

5. The process of claim 4 wherein the cooled hydrocarbon that is withdrawn from the lower part of said tower is heated by external means and then reintroduced into said upper part of said tower.

6. The process of claim 1 wherein said hydrocarbon consists of petroleum fractions which remain stable under waste coking conditions of 400° to 750°F. and pressures of 300 to 3000 psig. selected from the group of kerosine, naphtha, odorless spirits gasoline, lubricating oil, bottoms fractions obtained from the alkylation of isobutane with butylenes and/or propylene, $C_9$–$C_{10}$ aromatic hydrocarbons, Udex extract and mixtures thereof.

7. The process of claim 1 wherein said hydrocarbon is hexane, 2,3-dimethylbutane, heptane, octane, isooctane, nonane, decane, propylene tetramer, hexadecane, 2-methyl-1-pentene, methylcyclopentane, cyclohexane, methylcyclohexane, dimethylcyclohexane, ethylcyclohexane, tetralin, isopropylcyclohexane, cyclohexene, pinene, benzene, toluene, cumene, xylene, methylnaphthalene and mixtures thereof.

* * * * *